United States Patent [19]

Hamai et al.

[11] Patent Number: 5,193,436

[45] Date of Patent: Mar. 16, 1993

[54] ENGINE PISTON

[75] Inventors: Kyugo Hamai; Takayuki Arai; Takaharu Goto; Hisafumi Usuki, all of Yokohama, Japan

[73] Assignee: Nissan Motor Co., Ltd., Yokohama, Japan

[21] Appl. No.: 824,850

[22] Filed: Jan. 23, 1992

[30] Foreign Application Priority Data

Jan. 25, 1991 [JP] Japan .................................. 3-25455

[51] Int. Cl.$^5$ ................................................ F16J 1/04
[52] U.S. Cl. ........................................ 92/233; 92/237
[58] Field of Search ......................... 92/177, 233, 237; 123/193.6

[56] References Cited

U.S. PATENT DOCUMENTS

| | | | |
|---|---|---|---|
| 2,309,555 | 1/1943 | Venner et al. | 92/233 |
| 2,513,814 | 7/1950 | Moore | 92/233 |
| 4,535,682 | 8/1985 | Collyear et al. | 92/239 |
| 4,756,241 | 7/1988 | Sakurahara et al. | 92/233 |
| 4,817,505 | 4/1989 | Rhodes | 92/237 |
| 4,831,919 | 5/1989 | Bruni | 92/233 |

Primary Examiner—Edward K. Look
Assistant Examiner—F. Daniel Lopez
Attorney, Agent, or Firm—Pennie & Edmonds

[57] ABSTRACT

This invention relates to the shape of a skirt below the piston head of a piston in an engine cylinder and continuous with it. The skirt has a basic configuration comprising at least two type of elliptical horizontal cross-section with a short axis parallel to said piston pin, and a barrel-shaped vertical cross-section smaller at its top and bottom. A T-shaped projection is also provided on the lateral surfaces of the skirt corresponding to the two ends of the long axis of said ellipse, this projection consisting of a vertical piece and two side pieces situated on either side of the vertical piece. When the engine is running, the skirt comes into contact with the inner surface of the cylinder via this projection. The vertical section of the lower part of the skirt from below the lower edge of the two side pieces to the lower edge of the skirt is inclined toward the inside of said barrel-shaped vertical section so that the skirt is joined smoothly to the projection below the two side pieces. Accumulation of pressure on the edge of the projection is thereby prevented, which reduces frictional resistance and prevents wear between the piston and the cylinder.

4 Claims, 3 Drawing Sheets

ENGINE PISTON

FIELD OF THE INVENTION

This invention relates to the shape of a piston in a reciprocated engine, and more particularly, the shape of a skirt formed underneath the piston head of such a piston.

BACKGROUND OF THE INVENTION

The piston of a reciprocated engine generally has a skirt formed underneath the piston head, this skirt being connected to a connecting rod via a piston pin passing through the skirt. This skirt has the function of supporting the piston so as to prevent it from inclining under the force of the combustion energy acting upon it, and it slides on the inner circumference of the cylinder.

As the skirt suffers considerable thermal expansion in a direction of the piston pin due to the combustion heat of the engine, it may for example be formed with an elliptical cross-section having the short axis on the direction of the piston pin, and the long axis on the direction perpendicular to the piston pin.

Although the skirt supports the piston, it should not increase the frictional resistance of the piston. For this reason, it is desirable that the area of contact between the skirt and the cylinder is kept small to the extent that the necessary support is not lost.

For this purpose, Tokkai Sho 58-38357 published by the Japanese Patent Office discloses a piston having a projection to promote contact between the skirt and the piston.

Further, in Japanese Patent Applications Tokugan Hei 1-250527 and Tokugan Hei 1-335753, this Applicant has proposed varying the shape on one side of the piston pin, and a piston having a T-shaped projection.

However, if the skirt is given a projection in this way, contact pressure with the cylinder tends to concentrate on the edge of the projection. As a result, the thin film of lubricating oil on the inner surface of the cylinder breaks easily, and there is a risk of increasing frictional resistance between the piston and cylinder or of increasing local wear. Further, if the pressure is unevenly distributed on the edge, the piston may seize up if it slides slowly when the contact pressure with the cylinder is large as when the engine is running under low speed, high load conditions.

SUMMARY OF THE INVENTION

It is therefore an object of this invention to cause the distribution of pressure exerted by the cylinder on the projection of the piston skirt to vary smoothly such that it is higher in the center of the projection and lower on the outside irrespective of the engine running conditions.

In order to achieve the above object, this invention provides an engine piston having a piston head with a circular cross-section, a skirt formed below the piston head and continuous with it, a piston pin traversing the skirt and a connecting rod connected through this pin.

The skirt of the piston has a basic configuration comprising at least two types of elliptical horizontal cross-section with a short axis parallel to said piston pin, and a barrel-shaped vertical cross-section smaller at its top and bottom. The skirt also has an approximately "T"-shaped projection on the lateral surfaces of the skirt corresponding to the two ends of the long axis of the ellipse. This projection consists of a vertical piece and two side pieces situated on either side of the vertical piece. A vertical section of the lower part of the skirt from below the lower edge of the two side pieces to the lower edge of the skirt is inclined toward the inside of the barrel-shaped vertical section so that the skirt is joined smoothly to the projection below the two side pieces.

According to a preferred aspect of this invention, the eccentricity of the elliptical horizontal cross-section passing through the center of the piston pin is smaller than that of the elliptical horizontal cross-section below the piston pin.

According to another preferred aspect of this invention, the barrel-shaped vertical cross-section of the skirt from which the two side pieces project has a smaller radius of curvature than the barrel-shaped cross-section of the skirt from which the vertical piece projects.

According to yet another preferred aspect of this invention, the shortening of the diameter of the barrel-shaped vertical cross-section is greater nearer the top closer to the piston head.

DESCRIPTION OF THE PREFERRED EMBODIMENTS

Figure 1:
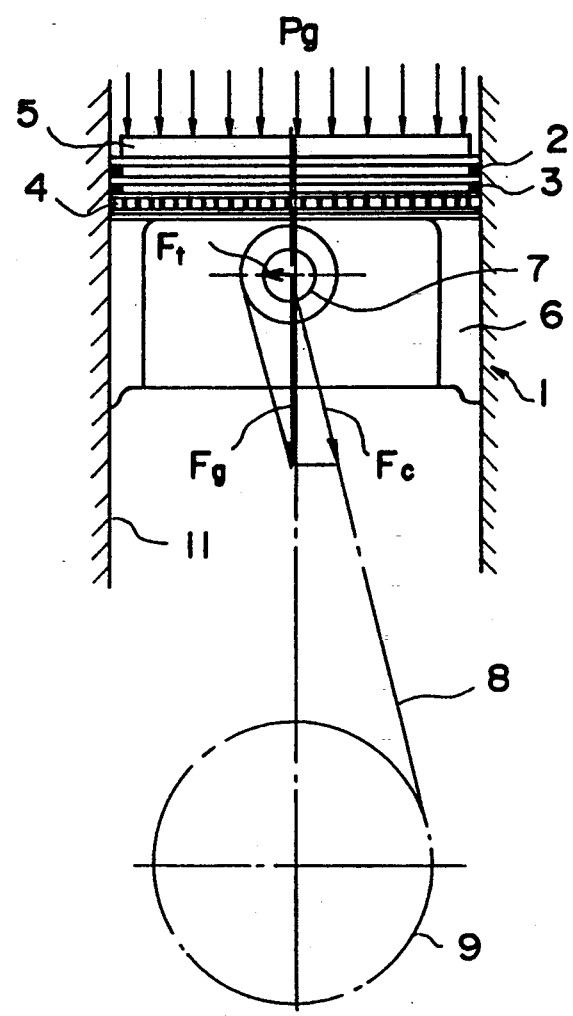
FIG. 1 shows a vertical section of the main parts of a cylinder housing a piston according to this invention.

As shown in FIG. 1, a piston 1 is provided with a piston head 5 fitted with rings 2, 3 and an oil ring 4, and with a skirt 6 beneath the head. The skirt 6 is connected to a connecting rod 8 via a piston pin 7 perpendicular to the central axis of the piston 1.

The piston 1 reciprocates in a cylinder 11 due to a combustion pressure Pg of a combustion chamber 10, and rotates a crankshaft 9 via the piston pin 7 and connecting rod 8.

When the piston 1 is moving down from top dead center to bottom dead center, the full force Fg of the combustion pressure Pg exerts a force Fc in the axial direction of the connection rod 8 via the piston 1, and a force Ft is exerted on the piston 1 in the direction of thrust. Due to the action of this force Ft in the direction of thrust, the piston 1 is pressed against the wall of the cylinder 11 on the left of the drawing. Further, when the piston 1 is moving up from bottom dead center, the inertia of the crankshaft 9 lifts the piston 1 via the connecting rod 8, and the piston 1 is simultaneously pushed against the wall of the cylinder on the right of the drawing.

Figure 2:
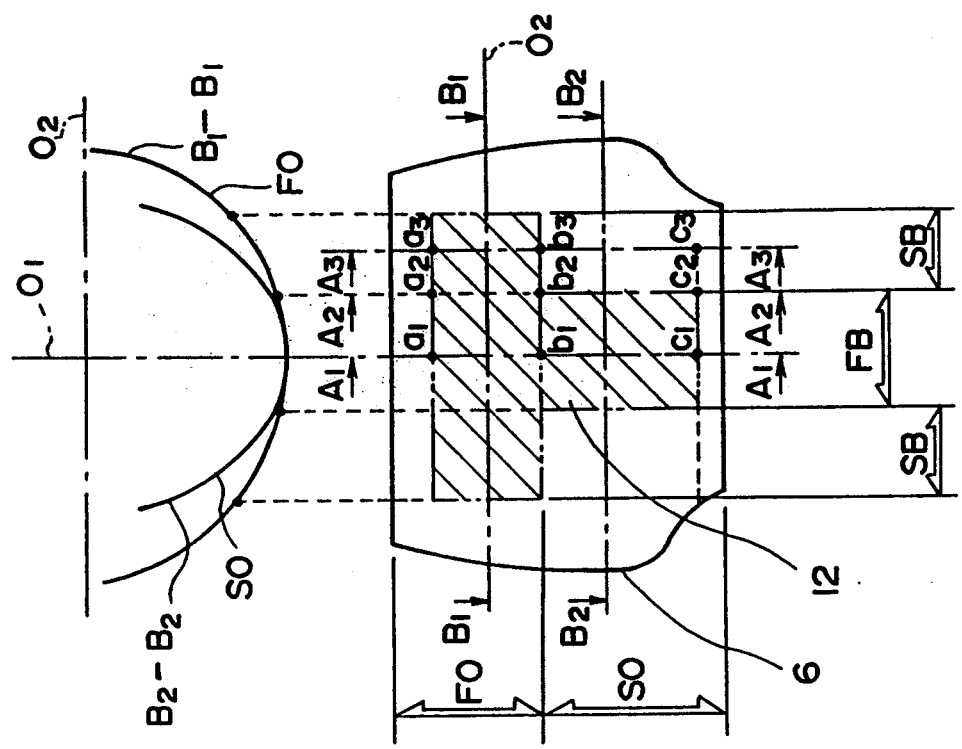
FIG. 2 is a composite drawing showing a plan view and lateral view of the shape of the piston skirt according to this invention.

The shape of the skirt 6 of the piston 1 is shown in FIG. 2. In this figure, $O_2$ is the center line of the piston pin 7. $O_1$ indicates a vertical face passing through the center of the piston 1 in the direction perpendicular to the line $O_2$. The aforesaid force Ft acts mainly on the line of intersection of the circumference of the skirt 6 and this vertical plane $O_1$. A section taken horizontally through the skirt 6 is an ellipse whose long axis lies in the vertical plane $O_1$, and the short axis lies in a vertical plane containing $O_2$.

This section varies in the axial directions. In a section $B_1$—$B_1$ containing the center line $O_2$ of the piston pin 7, it is an ellipse FO of small eccentricity, while further down in the section $B_2$—$B_2$, it is an ellipse SO of large eccentricity. Eccentricity means the ratio of the short diameter and long diameter of an ellipse, and the smaller the eccentricity, the closer the ellipse is to a circle. The section through the skirt 6 therefore becomes closer to a circle the further up it is taken.

On the other hand, a section taken through the skirt 6 in the vertical plane $O_1$ is basically in the form of a barrel which is narrower at the top and bottom. This basic shape is shown by the broken line in FIG. 3.

In addition to the aforesaid basic shape, a projection 12 is also formed as a continuous extension of body of the skirt 6 as shown by the shaded part of FIG. 2. This projection 12 is formed at the intersections of the circumference of the skirt 6 and the vertical plane $O_1$. The projection 12 is in the form of a "T" shape comprising a vertical piece FB and two side pieces SB. This T-shaped projection 12 is actually a distortion of the basic barrel shape of the skirt 6.

Figure 3:
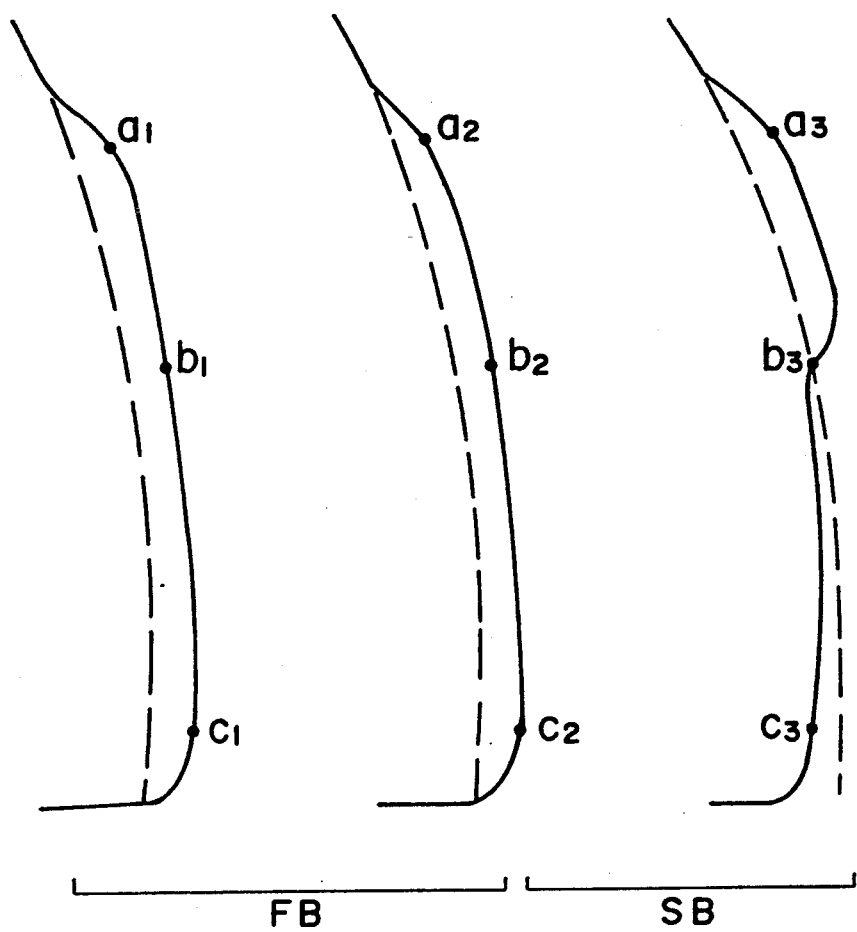
FIG. 3 shows the sections $A_1$—$A_1$, $A_2$—$A_2$, $A_3$—$A_3$ in FIG. 2.

In this construction, at the position shown by $A_1$—$A_1$ in FIG. 2, the part $a_1$-$c_1$ protrudes outside the aforesaid barrel shape, at the position shown by $A_2$—$A_2$, the part $a_2$-$c_2$ protrudes outside the barrel shape, but at the position shown by $A_3$—$A_3$, only the part $a_3$-$b_3$ protrudes outside the barrel shape as shown in FIG. 3. To better explain the shape of this projection 12, the horizontal dimension has been distorted to be greater than the vertical dimension, although the actual height of the projection 12 is very small. Further, the contraction of the diameter of the barrel in this figure has been exaggerated toward the top near the piston head 5 and the top is largely inclined toward the left of the figure. This is due to the fact that the temperature rise due to combustion is more severe nearer the top of the skirt 6 which is close to the piston head 5, and the skirt therefore expands more to the outside.

The projection 12 is formed such that the gap with the wall of the cylinder 1 when the engine is running is 0–25 μm, a gap of at least 25 μm being maintained between the outer circumference of the skirt 6 and the inner circumference of the cylinder 11 apart from at the projection 12.

Due to this T-shaped projection, the skirt 6 comes into contact with the cylinder 11 over a large surface area on one side of the piston rod 7, and sufficient support therefore acts on the skirt 6 against the force acting on the cylinder 11. Further, below the piston pin 7, the skirt 6 comes into contact with the inner surface of the cylinder 11 via the vertical piece FB of small surface area, and frictional resistance is therefore reduced.

However, if the skirt 6 has the above construction, there is a step between the two side pieces SB of the projection 12 and the outer circumference of the lower part of the skirt 6.

If this step is very sudden, the pressure exerted on the skirt 6 by the cylinder 11 varies rapidly above and below the step when the engine is running, and a high pressure therefore acts on the lower edge of the two side pieces SB of the projection 12. The lower edges of the two side pieces SB therefore tend to break the thin film of lubricating oil on the inner wall of the cylinder 11 when the projection 12 is sliding. This increases the frictional resistance and local wear between the piston 1 and the cylinder 11.

In this invention, however, the skirt 6 below the two side pieces SB is made to lean toward the inside of the basic barrel shape as shown by the section $b_3$-$c_3$ of FIG. 2. The skirt 6 is therefore joined to the side pieces SB of the projection 12 by smooth curves.

This is achieved by forming the two side pieces SB in a barrel shape having a different degree of barreling from the basic barrel shape of the vertical piece FB of the projection 12, the barrel shape of the skirt 6 at the two side pieces SB having a smaller radius of curvature than that of the skirt 6 at the vertical piece FB.

The barrel shape of the skirt 6 does not change in the interval of the vertical piece FB and in the intervals of the two side pieces SB, but it is also possible to make the radius of curvature of the barrel shape gradually become smaller as the distance to the left or right of the center of the vertical piece FB becomes greater.

Figure 4:
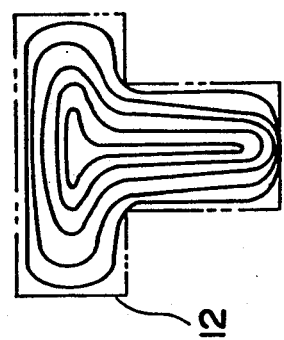
FIG. 4 shows the pressure distribution on the contact surface of FIG. 2.

As a result of the smooth curves between the side pieces SB and the skirt 6 aforementioned, the pressure exerted by the skirt 6 on the cylinder 11 is greatest in the middle of the T-shaped projection 12 as shown in FIG. 4, and it declines towards the edge of the projection. The form of this pressure distribution follows the load acting on the piston 1.

There is therefore no accumulation of pressure on the edge of the projection 12, and no risk of the oil film on the inner circumference of the cylinder 11 breaking when the piston 1 slides. The piston 1 can thus be made to slide with very little frictional resistance and local wear.

This invention is not limited to the above embodiment, and various modifications can be made without departing from the spirit thereof within the scope of the claims appended.

The embodiments of this invention in which an exclusive property or privilege is claimed are defined as follows:

1. A piston adapted to slide in an engine cylinder having a piston head with a circular cross-section, a skirt formed below said piston head and continuous with it, a piston pin traversing said skirt and a connecting rod connected to this pin, wherein said skirt has a basic configuration comprising at least two types of elliptical horizontal cross-section with a short axis parallel to said piston pin, and a barrel-shaped vertical cross-section smaller at its top and bottom, said skirt has an approximately "T"-shaped projection on the lateral surfaces of said skirt corresponding to the two ends of the long axis of said ellipse, said projection consisting of a vertical piece and two side pieces situated on either side of said vertical piece, and a vertical section of the lower part of said skirt from below the lower edge of said two side pieces to the lower edge of said skirt is inclined toward the inside of said barrel-shaped vertical section so that said skirt is joined smoothly to said projection below said two side pieces.

2. A piston adapted to slide in an engine cylinder as defined in claim 1, wherein the eccentricity of the elliptical horizontal cross-section passing through the center of said piston pin is smaller than the eccentricity of the elliptical horizontal cross-section below said piston pin.

3. A piston adapted to slide in an engine cylinder as defined in claim 1, wherein the barrel-shaped vertical cross-section of said skirt from which said two side pieces project has a smaller a radius of curvature than the barrel-shaped vertical cross-section of said skirt from which said vertical piece projects.

4. A piston adapted to slide in an engine cylinder as defined in claim 1, wherein the shortening of the diameter of said barrel-shaped vertical cross-section is greater nearer the top closer to said piston head.

* * * * *